United States Patent [19]

Shafer

[11] 4,412,723
[45] Nov. 1, 1983

[54] OPTICAL SYSTEM FOR CORRECTING THE ABERRATIONS OF A BEAMSPLITTER IN CONVERGING LIGHT

[75] Inventor: David R. Shafer, Fairfield, Conn.

[73] Assignee: The Perkin-Elmer Corporation, Norwalk, Conn.

[21] Appl. No.: 267,950

[22] Filed: May 28, 1981

[51] Int. Cl.³ ............................................. G02B 27/10
[52] U.S. Cl. ................................... 350/171; 350/447
[58] Field of Search ............... 350/171, 173, 169, 174, 350/172, 170, 445, 436, 447, 291

[56] References Cited

U.S. PATENT DOCUMENTS

| 2,792,740 | 5/1957 | Haynes | 350/171 |
| 3,589,796 | 6/1971 | Schaefer | 350/174 |
| 4,288,148 | 8/1981 | Offner et al. | 350/445 |

FOREIGN PATENT DOCUMENTS 2042757  9/1980  United Kingdom ............... 350/436

OTHER PUBLICATIONS

Offner, Abe, *Applied Optics*, vol. 13, No. 2, Feb. 1974, p. 242.

*Primary Examiner*—John W. Henry
*Attorney, Agent, or Firm*—S. A. Giarratana; E. T. Grimes; T. P. Murphy

[57] ABSTRACT

An optical system for forming two separate images. A beamsplitter disposed in the path of a converging or diverging beam of light forms a reflected image and transmitted image. A thin positive lens disposed in the path of the transmitted beam of light selectively corrects the transmitted image for any or all of the following problems—spherical aberrations, coma, astigmatism, longitudinal and lateral color.

5 Claims, 1 Drawing Figure

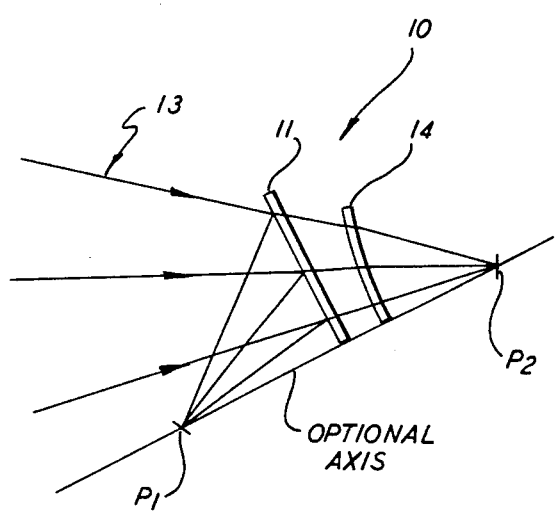

OPTICAL SYSTEM FOR CORRECTING THE ABERRATIONS OF A BEAMSPLITTER IN CONVERGING LIGHT

BACKGROUND OF THE INVENTION

A tilted parallel plate in converging light is useful as a beamsplitter to form two separate images. However, whereas with such a tilted plate the reflected image is perfect, the transmitted image may contain spherical aberration, coma, astigmatism and in chromatic light longitudinal and lateral color.

In the past these problems have been found to be correctable. However, past methods of correction have employed highly complicated and costly lens systems requiring the use of wedges, torics and/or multiple decentered and tilted lenses.

The present invention provides a simple and inexpensive lens arrangement for overcoming these problems.

BRIEF SUMMARY OF THE INVENTION

This invention relates to a simple, cost efficient lens system for correcting the various imperfections in the transmitted image of a tilted beamsplitter. The present invention utilizes a thin weak positive lens disposed in the converging path of the image carrying light passing through the beamsplitter. The lens is bent toward the transmitted image and in general has front and back radii which terminate on a line passing through the reflected and transmitted images.

DRAWINGS

The drawing is a schematic representation applicable to various embodiments of the present invention.

DESCRIPTION

Referring to the FIGURE there is shown the optical system 10 of the present invention. It comprises a beamsplitter 11 disposed tilted relative to a converging beam of light 12. The beam of light may also be diverging.

The beam of light 12 is reflected from the front of the beamsplitter 11 to form a reflected image at $P_1$. This image is substantially perfect. However, the image formed by the light transmitted through the beamsplitter may have spherical aberration, coma and astigmatism when the light is monochromatic. When the light is chromatic the image may also have chromatic aberrations such as longitudinal and lateral color.

The beamsplitter 11 introduces spherical aberration since it overcorrects for spherical aberration. Coma and astigmatism are a result of the tilt of the beamsplitter with coma varying linearly with the angle of tilt and astigmatism varying quadratically with the angle of tilt of the beamsplitter. Spherical aberration is independent of the angle of tilt and is related only to thickness and index of the beamsplitter 11.

Applicant has discovered that a thin positive lens 14 disposed in the path of the beam transmitted through the beamsplitter is effective to correct for the above discussed problems and produces an image at $P_2$ substantially identical to the image at $P_1$.

In the FIGURE the optical axis is chosen to be the line passing through points $P_1$ and $P_2$, i.e., through the reflected and transmitted images. The lens 14 is bent toward the transmitted image and the centers of curvature thereof fall on the optical axis, i.e. the radii of the front and back of the lens 14 terminate on the optical axis. In addition, other parameters or variables of the optical system of the present invention are referenced to this optical axis with the obvious exception of the various indices of refraction.

The parameters involved are an index of refraction, thickness of the beamsplitter 11 and lens 14, radii of the front and back of both the beamsplitter 11 and lens 14 and the position of the lens 14 relative to the beamsplitter or the transmitted image. Since in all examples discussed below the beamsplitter 11 has a flat front and back whose radii are infinite, i.e., the front and back are parallel, these radii are not variable.

In order to correct for an extended field image in monochromatic light (monochromatic light introduces no color aberration) using fused silica the following parameters all measured along the optical axis apply:

| | |
|---|---|
| Thickness of beamsplitter = | 0.50 inches |
| Thickness of lens = | 0.50 inches |
| Front radius of lens = | 10.602 inches |
| Back radius of lens = | 11.200 inches |
| Back Focus or distance from back of lens to transmitted image at $P_2$ = | 2.633 inches |
| Back of beamsplitter to front of lens = | 1.000 inches |

An example of the optical system for use where the light beam is chromatic and the image is an single field point as opposed to an extended field the following parameters would be used. In this case also the glass in the beamsplitter 11 and lens is BK7 having an index of refraction of 1.517. In this case the front and back radii of the beamsplitter is infinite:

| | |
|---|---|
| Thickness of beamsplitter = | 0.15 inches |
| Thickness of lens = | 0.218 inches |
| Front radius of lens = | 4.578 inches |
| Back radius of lens = | 4.578 inches |
| Back focus or distance from back of lens to transmitted images at $P_2$ = | 2.660 inches |
| Back of beamsplitter to front of lens = | 0 inches |

This system corrects the chromatic and monochromatic aberrations of a single field point.

Another example of the optical system for an extended field in monochromatic light is given in the following parameters. The glass is BK7 having an index of refraction equal to 1.517 and the radii of the beamsplitter 11 are infinite:

| | |
|---|---|
| Thickness of beamsplitter = | 0.15 inches |
| Thickness of lens = | 0.319 inches |
| Front radius of lens = | 7.628 inches |
| Back radius of lens = | 7.628 inches |
| Back focus or distance from back of lens to transmitted image at $P_2$ = | 2.605 inches |
| Back of beamsplitter to front of lens = | 0 inches |

In other variations the parameters may be made to correct the transmitted light for chromatic or monochromatic light for extended fields or single field points.

While the various examples are expressed in inches it is pointed out that the various dimensions are relative and may be expressed in any dimensional unit.

It further should be noted that the aberrations discussed with respect to each of the examples discussed are corrected so long as the transmitted light coverges at the transmitted image or point P₂, in other words the angle that the beam makes with the optical axis does not matter. Thus, the beamsplitter 11 can be used in a variety of tilt angles by pivoting it about point P₂.

Other modifications of the present invention are possible in light of the above description which should not be construed as placing limitations on the invention other than those set forth in the claims which follow:

What is claimed is:

1. An optical system for providing substantially identical reflected and transmitted images carried in a beam of light, comprising in combination;
   a beamsplitter disposed in the path of the beam of light providing a reflected and transmitted image,
   a lens disposed in the path of said beam of light transmitted through said beamsplitter, said lens bent toward said transmitted image and having front and back radii which terminate on a line connecting said reflected and transmitted images.

2. An optical system according to claim 1 wherein,
   the front and back of said beamsplitter are parallel,
   the front and back radii of said lens are 10.602 and 11.2 units, respectively,
   the thickness of said beamsplitter and lens are 0.5 units,
   the indices of refraction of said beamsplitter and lens are 1.5,
   the distance along said line from the back of said lens to the center of said transmitted image is 2.633 units,
   the distance along said line from the back of said beamsplitter to the front of said lens is 1 unit.

3. An optical system according to claim 1 wherein,
   the front and back of said beamsplitter are parallel,
   the front and back radii of said lens are 4.578 units each,
   the thickness of said beamsplitter and lens are 0.15 and 0.218 units respectively,
   the indices of refraction of said beamsplitter and lens are 1.517,
   the distance along said line from the back of said lens to the center of said transmitted image is 2.660 units,
   the distance along said line from the back of said beamsplitter to the front of said lens is 0 units.

4. An optical system according to claim 1 wherein,
   the front and back of said beamsplitter are parallel,
   the front and back radii of said lens are 7.628 units each,
   the thickness of said beamsplitter and lens are 1.5 and 0.319 units respectively,
   the indices of refraction of said beamsplitter and lens are 1.517,
   the distance along said line from the back of said lens to the center of said transmitted image is 2.605 units,
   the distance along said line from the back of said beamsplitter to the front of said lens is 0 units.

5. An optical system according to claims 2, 3, 4 or 1 wherein,
   said beamsplitter and lens can be pivoted about the point defined by said line and said transmitted image to change position relative to the direction of the beam of light without affecting the corrective properties of said lens.

* * * * *